United States Patent
Strader (10) Patent No.: US 7,878,097 B2
(45) Date of Patent: Feb. 1, 2011

(54) POWERED WEED TRIMMER CUTTING HEAD AND METHOD

(76) Inventor: Gordon Strader, 6233 Arlington Dr., Boise, ID (US) 83709

( * ) Notice: Subject to any disclaimer, the term of this patent is extended or adjusted under 35 U.S.C. 154(b) by 526 days.

(21) Appl. No.: 12/033,699

(22) Filed: Feb. 19, 2008

(65) Prior Publication Data

US 2008/0196255 A1 Aug. 21, 2008

Related U.S. Application Data

(60) Provisional application No. 60/901,764, filed on Feb. 16, 2007.

(51) Int. Cl.
*B26B 7/00* (2006.01)
*B26B 9/00* (2006.01)
*A01D 34/00* (2006.01)
*A01D 34/52* (2006.01)
*A01D 34/73* (2006.01)

(52) U.S. Cl. ............... 83/13; 30/276; 30/347; 56/12.7; 56/295

(58) Field of Classification Search ............ 30/276, 30/347; 56/12.7, 295
See application file for complete search history.

(56) References Cited

U.S. PATENT DOCUMENTS

| | | |
|---|---|---|
| D280,903 S | 10/1985 | Barbula |
| D301,110 S | 5/1989 | Barbula |
| 5,617,636 A * | 4/1997 | Taggett et al. ............ 30/276 |
| 5,622,035 A * | 4/1997 | Kondo et al. ............. 56/12.7 |
| 5,640,836 A | 6/1997 | Lingerfelt |
| 5,722,172 A * | 3/1998 | Walden ................. 30/347 |
| 5,887,349 A * | 3/1999 | Walden ................. 30/347 |
| 6,112,416 A * | 9/2000 | Bridges et al. ........... 30/276 |
| 6,119,350 A * | 9/2000 | Sutliff et al. ............ 30/276 |
| 6,427,341 B1 | 8/2002 | Lee |
| 6,446,346 B1 | 9/2002 | Castleman |
| 6,681,865 B2 * | 1/2004 | Pace ................... 172/111 |
| 6,817,102 B2 | 11/2004 | Harris et al. |
| 6,827,152 B2 * | 12/2004 | Iacona .................. 172/42 |
| 6,912,789 B2 | 7/2005 | Price, III |
| 7,155,889 B2 | 1/2007 | Myers |
| 7,614,153 B2 * | 11/2009 | Guerra ................. 30/276 |
| 2002/0029483 A1 * | 3/2002 | Price ................... 30/276 |
| 2005/0050738 A1 * | 3/2005 | Harris et al. ............ 30/276 |
| 2008/0010836 A1 * | 1/2008 | Iacona ................. 30/122 |

\* cited by examiner

*Primary Examiner*—Ghassem Alie
*Assistant Examiner*—Bharat C Patel
(74) *Attorney, Agent, or Firm*—Pedersen and Company, PLLC; Ken J. Pedersen; Barbara S. Pedersen (57) ABSTRACT

A cutting head attached to a powered rotary weed cutting machine has a generally cylindrical structure containing a plurality of cutting blades. The cylindrical structure has upper and lower portions which may be rotated with respect to one another to expose each entire cutting blade for replacement when required. A lock may be included to ensure that the upper portion does not open until desired by including a rigid plate or arm that, in a first position, extends through portions of both the upper portion and the lower portion to lock them together.

4 Claims, 10 Drawing Sheets

POWERED WEED TRIMMER CUTTING HEAD AND METHOD

This application claims priority of Provisional Application No. 60/901,764, filed Feb. 16, 2007, the entire disclosure of which is hereby incorporated by this reference.

BACKGROUND OF THE INVENTION

1. Field of the Invention

The present invention relates generally to gasoline or electrically powered devices used to trim or cut grass, weeds and brush, wherein a driven head assembly contains a plurality of cutting blades that rotate at high speed to cut the vegetation. The invented device relates more specifically to such a cutting device wherein the cutting head need not be disassembled to access the cutting blades and the blades are replaceable without the use of tools. This ease-of-replacement feature may be very beneficial at the cutting site where blades sometimes break, a quick fix is desired, and it is especially troublesome to drop pieces of the cutting device in the grass or weeds. Therefore, use of the invented device would be extremely practical by those persons who regularly use a powered weed cutting machine.

2. Related Art

Powered rotating vegetation cutting devices from the past have used a nylon string or a plurality of cutting blades rotating at a high rate of speed to cut plant matter. Periodically, the cutting blades in said conventional blade-based devices become unserviceable due to breakage or becoming dull and must be replaced. This operation normally requires the use of tools and at least partial disassembly of the cutting head to access the cutting blades. Frequently, a cutting blade may be broken during a cutting job due to striking a hard object such as a stone, tree trunk, etc. and it is desirable to replace the broken blade on the spot so that the cutting job may be completed. Thus, it becomes necessary to either return the cutting machine to the garage or shop to accomplish the task, or, to replace the cutting blade at the cutting site, wherein tools to do so must be carried on the person. Disassembly of the cutting head at the cutting site introduces the risk of the loss of cutting head parts within the vegetation at the cutting site and the attendant frustrating search through said vegetation to attempt to locate the missing parts.

Examples of conventional cutting heads are found in the patent literature. Barbula, in U.S. Pat. Nos. D280,903 and D301,110, illustrates cutting heads wherein screws are employed to retain the cutting blades upon the head, and wherein the cutting heads do not permit the removal and replacement of the cutting blades unless the screws are first removed. U.S. Pat. No. 6,119,350, Sutliff et.al.; U.S. Pat. No. 6,681,865 B2, Pace; and U.S. Pat. No. 6,912,789, Price, III each address a cutting head for a rotary trimming device wherein the cutting head must be disassembled and/or special tools are required to remove and replace the cutting blades.

There is a need for an improved rotary vegetation cutting head that allows blade changing without tools and without disassembly of the head. There is a need for such a cutting head that results in no loose parts or fasteners during use or maintenance, except for replacement blades and removed broken blades. Such a cutting head would be convenient and beneficial to those who have trouble or dislike using small tools and handling small parts. The present invention may meet these and other needs.

SUMMARY OF THE INVENTION

The present invention relates generally to powered rotating weed or brush cutting devices of the type that use a set of cutting blades mounted and secured within a cutting head and where the centrifugal force of rotation tends to maintain the cutting blades in a fully extended attitude in a plane perpendicular to the centerline/axis of rotation. The invented cutting head device eliminates the need to disassemble the cutting head to replace cutting blades, thereby eliminating the need to carry tools upon the person, and requires only that replacement blades be available at the cutting site if so desired.

The invented device comprises a generally cylindrical structure that rotates as a unit when coupled to a powered trimmer, but wherein the upper and lower portions may be rotated with respect to one another to access the cutting blades. Said rotation of the upper and lower portions relative to one another may include, for example, preferably rotating the upper portion relative to a stationary lower portion, or in other embodiments rotating the lower portion relative to a stationary upper portion, or in other embodiments rotating both upper and lower portions in opposite directions at the same time. The term "stationary" in this context means held without moving during the blade replacement process, but it should be understood that, after the blade replacement process, all parts of the preferred cutting head will rotate together or substantially together for the cutting process.

Preferably, the upper, or "cover," portion is held in the closed, operating position by one or more springs and/or by one or more locks. When it is desired to access the cutting blades, the lock(s), if any, is/are unlocked, and the cover portion is rotated using the hand (typically approximately 30 degrees) against the force of the spring to expose the pinned ends of the cutting blades, which then may be replaced as necessary. Upon completion of the replacement operation, all that is typically required to return the preferred device to operating condition is to release the hand from the cover to allow the cover to rotate back to the closed position, and, if present, the lock(s) is/are re-locked.

The preferred cutting device is constructed of materials that are lightweight, suitably strong, resilient, shock resistant and waterproof such as plastic, aluminum and like materials. The preferred device has three, evenly-spaced cutting blades, but embodiments with other numbers may be effective. The preferred device is capable of being retrofit to existing rotary cutting machines, replacing the cutting head originally supplied with said machines; in some cases, an adapter may be used to properly fit the preferred cutting head to the cutting machine.

BRIEF DESCRIPTION OF THE DRAWINGS

FIG. 13 is a cross-sectional view of the embodiment of FIGS. 12, viewed along the line 13-13 in FIG. 12, wherein FIG. 13 illustrates to the lock system of this embodiment in a locked condition. Note from FIGS. 12 and 13 that the lock system is offset from the central axis of the cutting head and does not interfere with attachment of the cutting head to the cutting machine by means of structure extending through the central bore/aperture of the cutting head.

In FIG. 16, the cover is in the closed and locked position.

DETAILED DESCRIPTION OF THE PREFERRED EMBODIMENTS

Referring to the Figures, there are shown several, but not the only, embodiments, of the invented cutting head device wherein the upper and lower portions may be rotated with respect to one another for convenient access to the cutting blades, said access preferably requiring neither the use of tools nor disassembly of the cutting head.

Figures 1, 2:
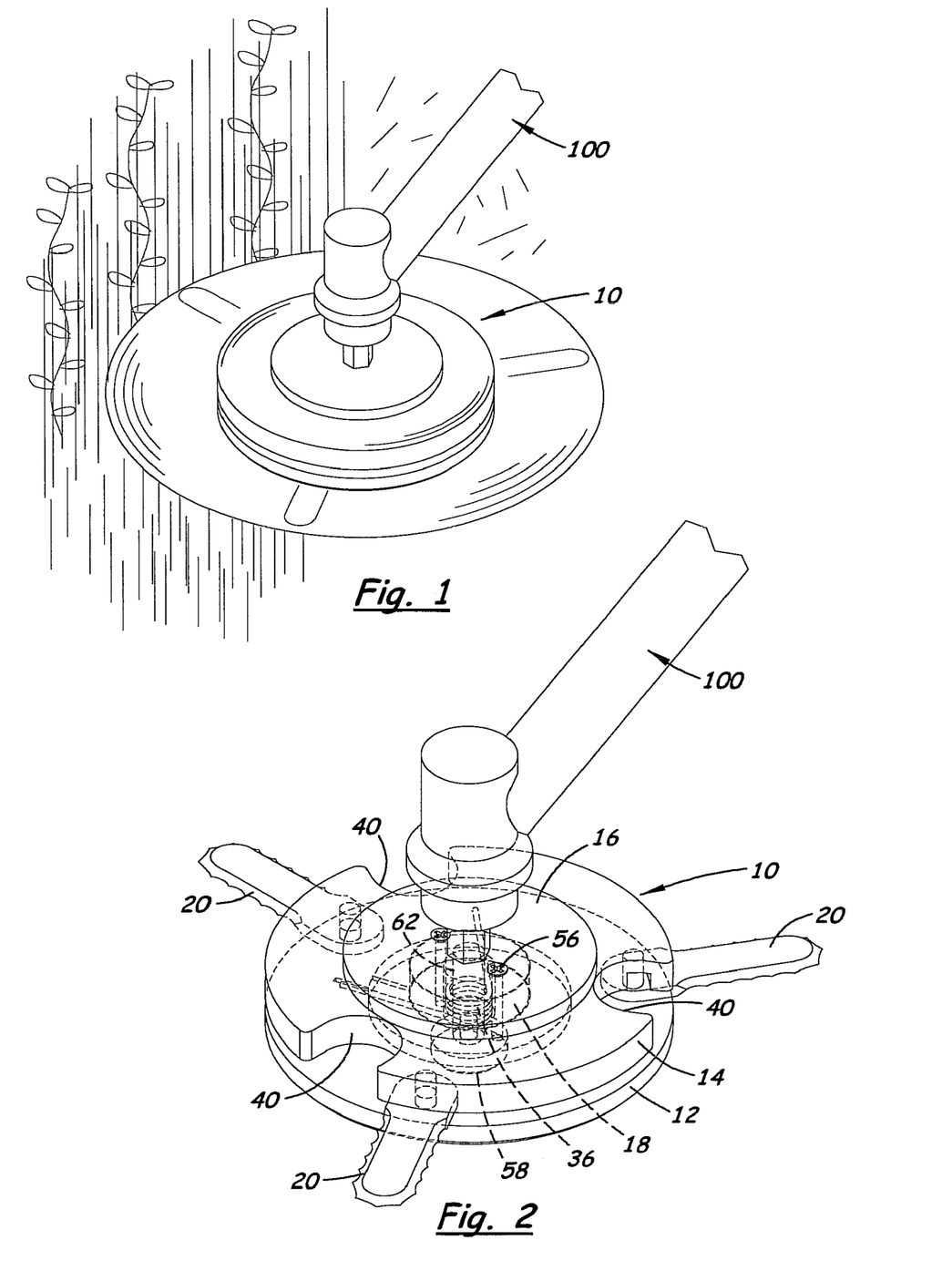
FIG. 1 is a perspective view according to one embodiment of the present invention, showing the device in use, wherein, due to the high speed of rotation of the cutting head, the details of the head and the blade are "blurred" in this drawing. The embodiment of FIG. 1 is understood to connect to a power unit with a handle for the user.
FIG. 2 is a perspective view according to the embodiment of FIG. 1, showing the device in the operating position but not yet rotating.

Referring now to FIG. 1, one embodiment of a vegetation cutting head 10 according to the invention is coupled to the drive end of a conventional rotary cutting machine 100 and is shown being driven in conventional manner by the machine to cut grass and weeds. Only a small portion of the shaft of the machine is shown in FIG. 1, but the nature and large variety of rotary cutting machines will be understood by one of skill in the art, and many are currently commercially available. In general, the cutting head is attached to the lower end of the cutting machine, with the rotating shaft of the machine received coaxially in the generally cylindrical cutting head and tightened to and/or otherwise engaging the cutting head so that the rotating shaft rotates the cutting head.

Figures 3, 4:
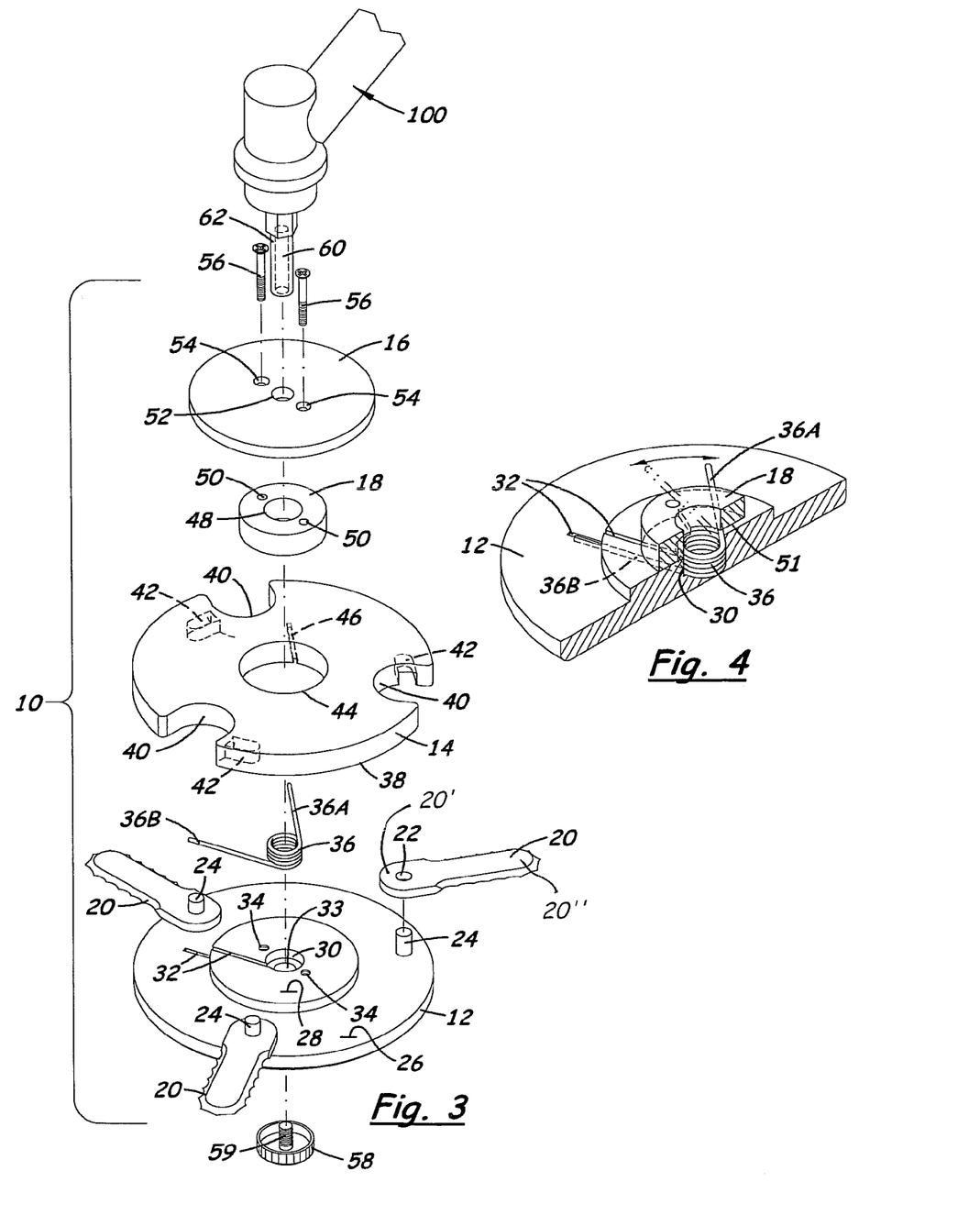
FIG. 3 is an exploded perspective view of the embodiment of FIGS. 1 and 2.
FIG. 4 is a partial perspective view of the embodiment of FIGS. 1-3, showing the action of one embodiment of a spring during the steps of revealing and recovering the ends of the cutting blades, which steps allow removal of a broken or dull blade and replacement with a new blade. The blades are not shown in FIG. 4.

Referring now to FIGS. 2-4, it will be seen that cutting head 10 is coupled to cutting machine 100, and is generally comprised of base portion 12 and cover 14. Cutting blades 20 are slidably installed on, or removed from, pins 24 extending upwards from the base portion 12, which pins 24 may be uncovered by means of access notches 40 in cover 14. Cap 16 and spindle 18 are secured to the base by fasteners 56, which may be seen to extend from/through cap 16, through spindle 18, through center plate 28, and into base 12. Cap 16 and fasteners 56 are used to secure spindle 18 and base 12 to one another by aligning holes 54 in cap 16, holes 50 in spindle 18, and threaded holes 34 through plate 28 and into base 12. Alternatively, if plate 28 if an integral, raised portion of base 12, then fasteners 56 may extend into and threadably engage holes 34 in plate 28 only, rather than extending farther down into base 12. It is important to note that fasteners 56 need not be removed, and the head 10 need not be disassembled, in order to remove the blades, as will be discussed further below.

The center plate 28 may be described as rising up above and inward (that is, closer to the central axis of the head and not extending as far out radially as the base), relative to the upper surface 26 of the base. Also, the spindle 18 may be described as rising up above and inward (closer to the central axis of the head and not extending as far out radially as the plate 28) relative to the plate 28.

Cover 14 is received between the cap 16 and the central plate 28, with cover 14 received around spindle 18 by means of central bore 44. Cover 14 may rotate on spindle 18 in its plane, which is parallel to the planes of cap 16, central plate 28, and base 12, to an extent controlled by spring 36, as discussed below. Cover 14 preferably rests and rotates on plate 28, and is spaced from the upper surface 26 of the base by a distance equal to the thickness (height) of plate 28.

Cutting head 10 is secured to cutting machine 100 utilizing shaft 62 of cutting machine 100, which extends down through the cap 16, spindle 18 (thus, extending through the cover on said spindle), and the base 12. Threaded knob 58 connects to shaft 62 by engaging threaded bore 60 of the shaft 62. It will be noted that with cover 14 in the closed position, cutting blades 20 are safely and positively secured and retained within cutting head 10, by virtue of being captured between the base 12 and the cover 14 in a plane parallel to both of said base and cover.

Referring now to FIG. 3, it will be observed that base 12 contains pins 24 anchored within and protruding upwardly to be received within holes 22 of cutting blades 20. Cutting blades 20, when installed upon pins 24, are free to rotate through an arc around the centerline of pins 24, thus allowing cutting blades 20 to rotate independently of the centrifugal force imparted by the rotation of the cutting machine 100. Thus, cutting blades 20, which normally will rotate in the positions/path shown in FIG. 1, may rotate out of the centrifugal path of rotation should a hard or immoveable object such as a rock be struck during a cutting operation.

Preferably, there are no screws, bolts, clamps, or fasteners used to secure the blades to the cutting head. The only fastening means for the blades is the blades being slidably and removably received on the pins, and the base 12 and cover 14 capturing the blades there-between. Further, preferably, there are not screws, bolts, clamps, or fasteners used to secure the cover to either the base 12 or the cap 16.

Shown to best advantage in FIGS. 3 and 4, center plate 28 (or "center pad 28") may be a plate attached by means of fasteners 56, for example, to the center portion of based 12, or, alternatively, plate 28 may be a raised, integral center portion of base 12. Center plate 28 is the surface upon which lower surface 38 of cover 14 rests, thus, creating a space between the outer upper surface 26 of base 12 and the lower surface 38 cover 14 in which the pinned ends of cutting blades 20 are contained. Within center pad 28 is bore 30 (which may also be considered an upper portion of base bore 33, especially if plate 28 is an integral portion of base 12), wherein the central, coiled portion of torsion spring 36 resides. Cut through plate 28 and into the upper surface 26 of the base is slot 32, which receives lower leg 36B of spring 36, thereby fixing the position of spring 36 within cutting head 10. When cover 14 is placed upon base 12, upper leg 36A of spring 36 resides within slot 46 cut within the lower surface 38 of cover 14. See, especially, FIGS. 3 and 10.

The lower leg (leg 36B) and central, coiled portion of spring 36, therefore, are captured in the base 12 and plate 28, while the upper portion (leg 36A) is captured in the cover 14. Spring 36 biases the cover to stay in a closed position relative to the base. At least the top coil of the central, coiled portion of the spring 36, and upper leg 36A, both extend upwards above the top surface of plate 28, said at least the top coil and leg 36A extend part way into spindle 18, as is shown to best advantage in FIG. 9. Leg 36A extends from the top coil, received in bore 48 of the spindle, to slot 46 in the cover, and, in doing so, extends through recess 51 of the bottom surface of spindle 18. Recess 51, shown to best advantage in FIG. 11, allows upper leg 36A to swing/pivot in said recess 51 as cover 14 is rotated with respect to base 12.

Figures 5, 6:
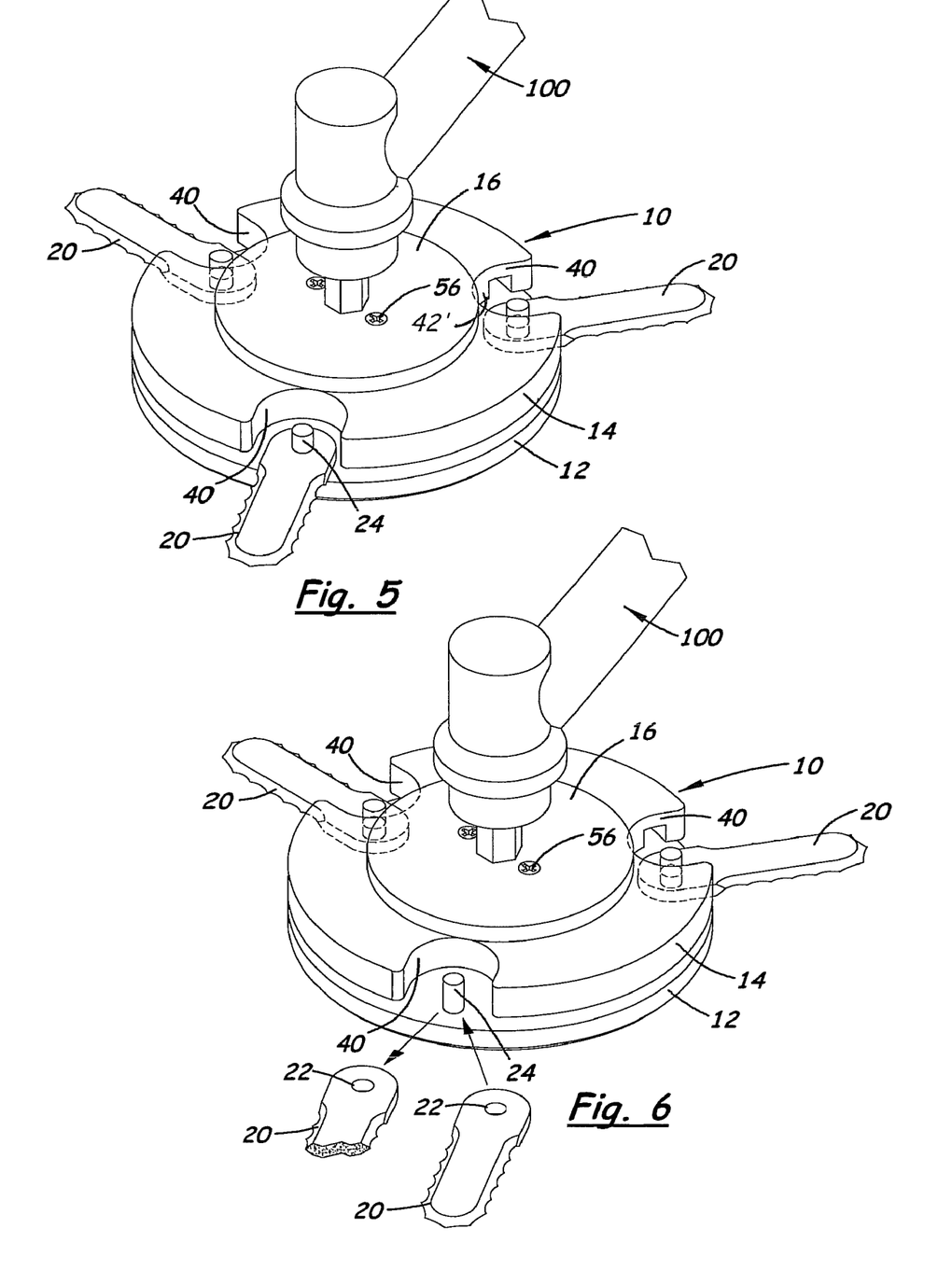
FIG. 5 is a perspective view of the embodiment of FIGS. 1-4, showing the device rotated open for blade replacement.
FIG. 6 is a perspective view of the embodiment of FIGS. 1-5, showing a broken blade being removed and replaced with a new blade.
Figure 10:
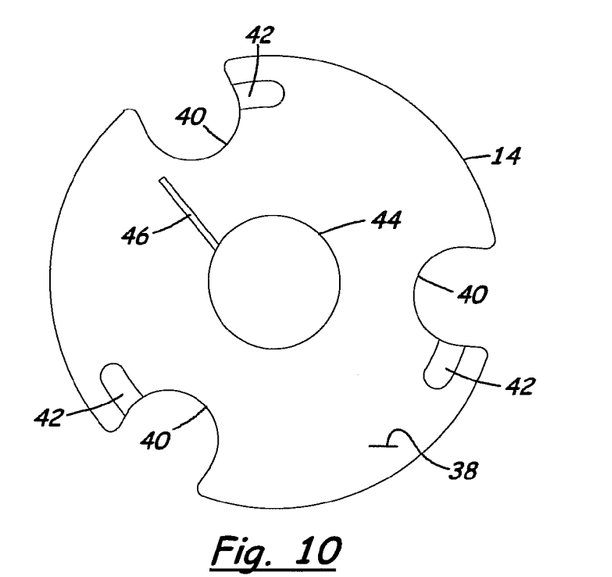
FIG. 10 is a bottom plan view showing the bottom surface and details of the cover of the embodiment of FIGS. 1-9.

Referring to FIGS. 3, 5, and 10, channels 42 in cover 14 fit loosely over the upper ends of pins 24, so that there is some space between the pins and the cover. The channels 42, however, are shaped and sized to limit said space, to prevent the blades 20 from falling or flying out of the cutting head when the cover is closed. Also, accommodation may be made to assist the channels 42 in sliding over the blades 20, when the cover closes, to help prevent jamming of the cover against the inner end 20 of the blade. This may be important for blades that, when installed over the pin, tend to tilt so that their inner ends 20' raise up off of the upper surface 26. For example, rounding or otherwise removing material from the channel corner 42' (see FIG. 5) may allow the cover to push the inner end 20' of the blade downward against the upper surface 26 of the base to be out of the way while the cover closes completely.

One of skill in the art will realize, upon reviewing this disclosure and the drawings, that there are various ways and structure of installing one or more springs or other biasing means in the cutting head. Preferably, one or more springs may be used and preferably are captured in the head at least to an extent that said one or more springs will not fall easily out of the cutting head during assembling the cutting head. As disassembly and re-assembly of the cutting head (after initial manufacture) is not required in the preferred embodiments, once the spring(s) are captured during manufacture, the spring(s) will typically not be likely to fall out or be lost. In the embodiment of FIGS. 1-11, a single spring of sufficient strength is used and positioned so that normal use of the cutting head will not tend to open the cover. While one orientation for the spring, cover, and cover slot system relative to the blades and the base is shown in FIGS. 1-11, said orientation may be changed for embodiments wherein the cutting head rotates in the reverse direction. Said orientation and the spring strength are adapted so that the spring bias is not overcome by the rotation of the cutting head, so that the cover does not open during cutting operation. Preferably, the spring bias acts in a direction opposite to the direction of rotation of the cutting head. Optionally, a cover lock may be included in the embodiment of FIGS. 1-11, to ensure that the cover does not open during cutting operation. Alternative embodiments are portrayed in FIGS. 12-22 that include two, but not the only, embodiments of lock systems, and/or different, but not the only, spring arrangements.

Cutting head 10 is secured to cutting machine 100 by inserting shaft 62 within and through aligned bore 52 in cap 16, bore 48 in spindle 18, and bores 30/33 in plate 28 and base 12. By extending through the plate 28 and its bore 30, the shaft 62 also extends through the center space of the coil of spring 36, which is received in bore 30. Treaded shaft 59 of knob 58 is threaded and tightened within threaded bore 60 of shaft 62 to complete the assembly.

FIG. 4 illustrates the position of spring 36 and spindle 18 upon base 12, wherein the spring may be seen to be captured in the slot 32 of the base, and slot 32 and bore 30 of the plate 28. The leg portion called-out as 36A in FIG. 4 extends from the recess 51 of spindle 18 to extend into slot 46 of the cover (not shown in FIG. 4).

FIG. 5 illustrates cover 14 in the open position wherein the cover 14 has been rotated to align notches 40 with, and to expose, the pinned ends of cutting blades 20. It may be noted that the diameter of cap 16 is significantly smaller than the diameters of cover 14 and base 12, and cap 16 does not extend across notches 40 or otherwise interfere with removal of the blades. It may be noted that the single cover (rotation of the single cover, relative to the base, to the open position) uncovers all of the blades at the same time for removal; thus, it is not necessary to manipulate multiple covers or multiple screws, bolts, clips, clamps, or fasteners in order to reveal and remove a plurality or all of the blades. When the preferred cover is opened and the cutting head is maintained with the head in a generally horizontal orientation, the blades will tend to remain on their pegs/pins until the user purposely removes one or more blades. As the blades 20 are retained in the cutting head only by means of being received on said pins 24, and being retained on said pins 24 by the cover (when the cover is closed), the blades might tend to fall off the pins and out of the cutting head if the cover were opened and the cutting head turned up-side down. Therefore, during normal blade replacement, the cover will be opened while the cutting head is held generally horizontally, so that the user (rather than gravity) may decide what blade(s) to remove. During weed-cutting operation, the cover will be closed and the device may be used in horizontal or tilted orientation.

FIG. 6 illustrates a broken cutting blade 20 having been removed from pin 24 and a new cutting blade 20 about to be installed.

Figure 7:
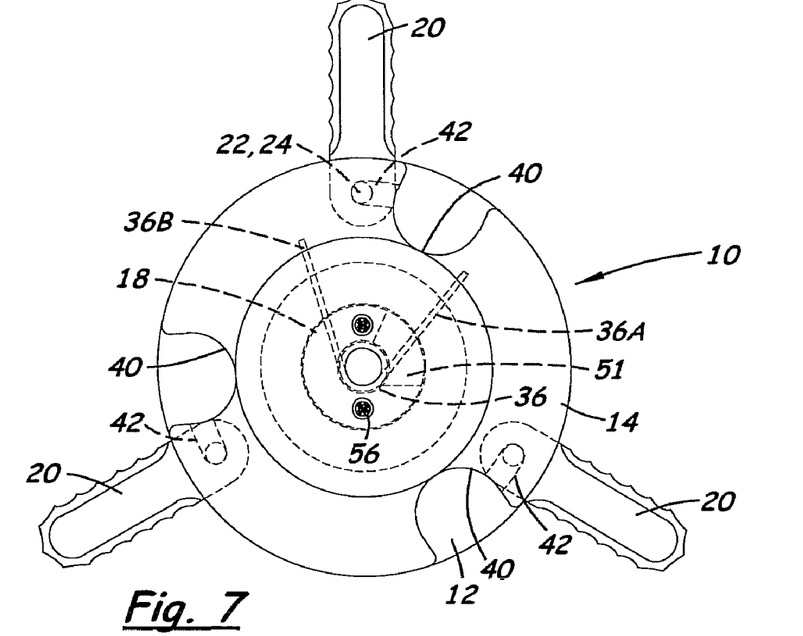
FIG. 7 is a top plan view according to the embodiment of FIG. 1-6, showing the cover closed.

FIG. 7 illustrates cutting head 10 with cover 14 in the closed position, with notches 40 rotated away from cutting blades 20 and pins 24 residing within channels 42.

Figure 8:
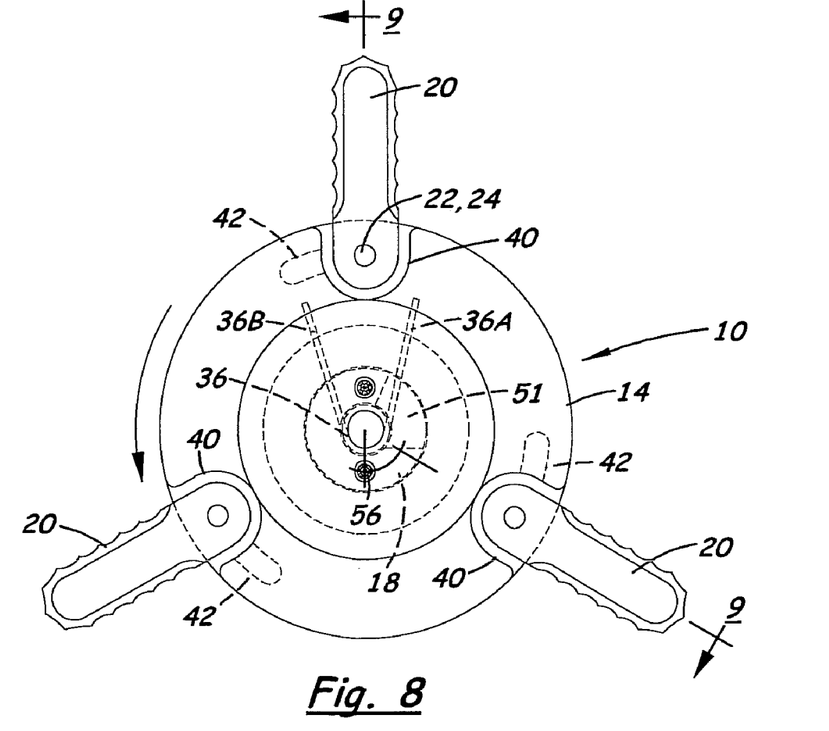
FIG. 8 is a top plan view according to the embodiment of FIG. 1-7, showing the cover open.

FIG. 8 illustrates cutting head 10 with cover 14 rotated to align notches 40 with the pinned ends of cutting blades 20. It will be noted that lower leg 36B of spring 36 remains stationary, while upper leg 36A of spring 36 rotates counter-clockwise within recess 51 of spindle 18.

Figure 9:
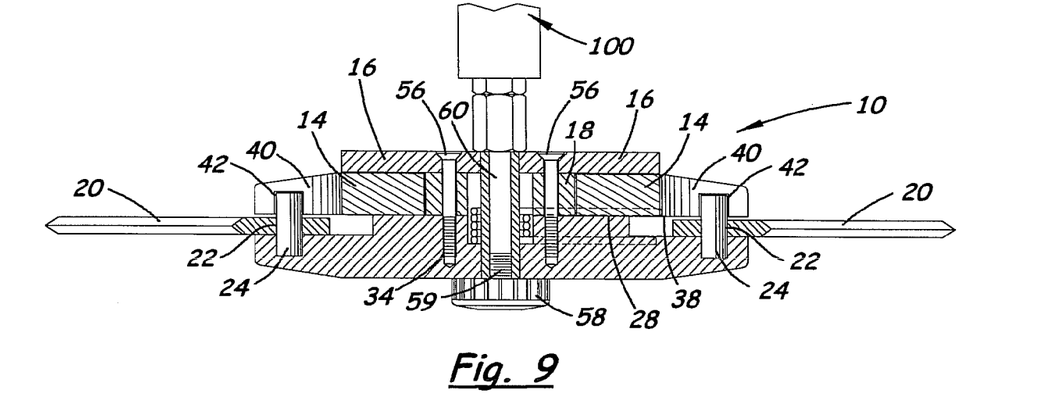
FIG. 9 is a cross-sectional elevation view of the embodiment of FIGS. 1-8.

FIG. 9, taken along line 9-9 of FIG. 8, illustrates the internal fitting of the various parts described in the preceding Figures.

FIG. 10 illustrates the lower surface 38 of cover 14.

Figure 11:
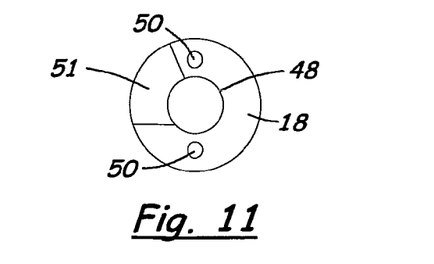
FIG. 11 is a bottom plan view showing the bottom surface and details of the spacer/spindle of the embodiment of FIGS. 1-10.

FIG. 11 illustrates the lower surface of spindle 18, wherein recess 51 is located to receive upper leg 36A of spring 36.

FIGS. 12-15 illustrate an alternative embodiment comprising a lock that is accessible from the top of the cutting head. As shown to best advantage in FIG. 13, cutting head 200 comprises base 212, which includes integral central plate 228 and integral spindle 218 upending from generally flat platform 225. Thus, the general structure and function of parts (base 12, plate 28, and spindle 18) that are separate in cutting head 10 are combined in cutting head 200 in a single, integral base 212. Spring 236 is embedded in base 212, with its lower arm 236B resting in a slot in the plate 228 and its coil resting in bore 233, and it upper arm 236B extending out, through recess 251 in the top surface 252 of the spindle 218, to reach the cover 214. Cover 214 rests on top of plate 228, receives spindle 218 in its bore (defined by surface 244), and is rotatable around spindle 218 for covering and uncovering the pinned ends of the blades (wherein the blades are not shown in FIGS. 12-15). Cap 216 rests on top of, and may be screwed or otherwise fixed to, the top surface 252 of spindle 218, with clearances provided so that cover 214 may rotate between plate 228 (upon which cover 214 rests) and cap 216 (which covers and contains cover 214). Pins 224 are provided in the platform 225, and may be secured therein by screws 227 extending inward from the outer perimeter of the platform 255 to engage the pins 224, or by other methods of anchoring the pins in the base.

The entire cutting head may be attached to the shaft of a cutting machine, as described earlier in this disclosure. For example, the cutting machine shaft extending through centrally-located aligned bores through the cutting head and connecting to a threaded knob (similar to knob 58) or by another fastener or other means.

Cutting head 200 comprises a lock 270 that ensures that the cover will not rotate, that is, will not open, during use on the cutting machine. Lock 270 comprises plate 272 that is resides, and slides vertically up and down, in a vertical slot 274 that is provided in the base 212, wherein typically a portion of the slot 274 is in all of the platform 225, plate 228, and spindle 218 portions and also a portion of the slot 274 is also in the cover 216. Handle 276 is provided at the top of the plate 272 and may be a portion of the plate 272 that is bent over to provide a horizontal finger-contact pad for being pushed by the user. The handle 276 is accessible at a top opening of the slot 274 at a top surface of the head 200, which may be the top surface of cap 216.

Figure 12:
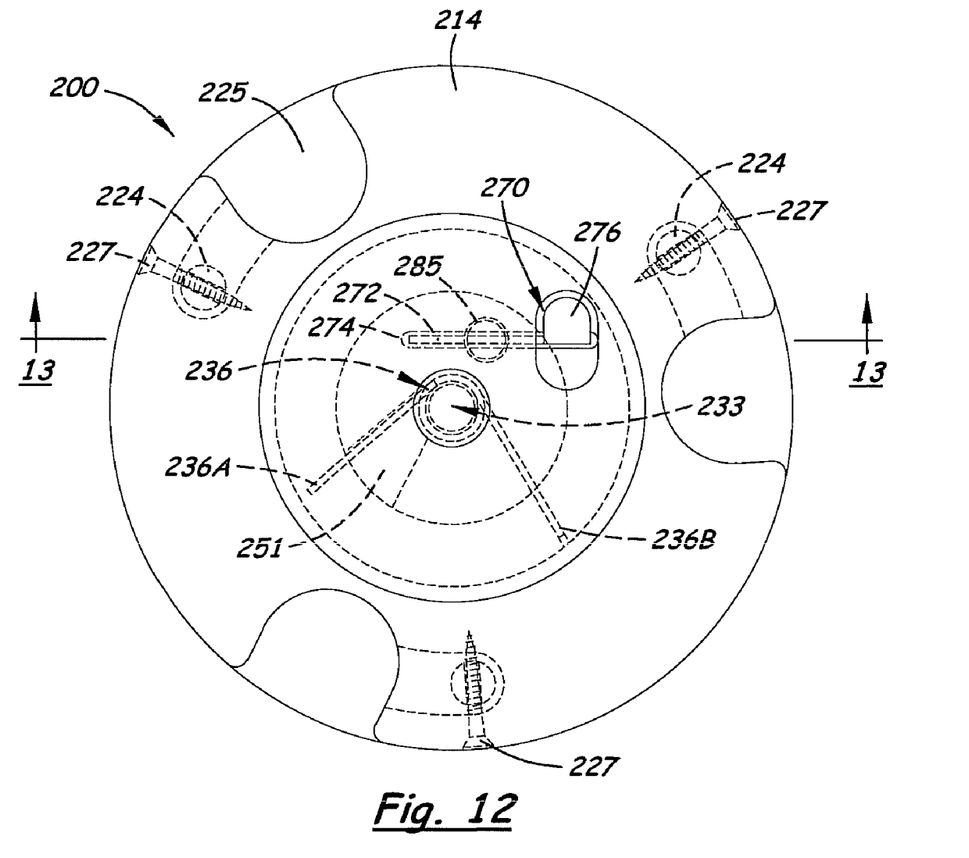
FIG. 12 is a top view of an alternative embodiment of the invented rotary cutting head, in the closed position, wherein the cutting head includes a safety lock for further ensuring that the cover will not open during use. For simplicity, the blades are not shown in FIG. 12, but it will be understood that they may reside and be retained on the pins by the closed cover in FIG. 12.
Figure 13:
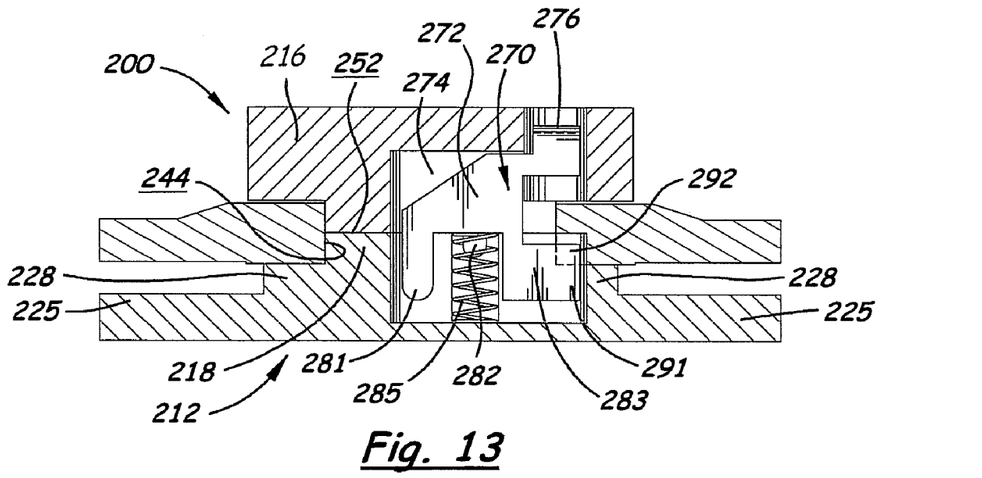

Plate 272 comprises three downwardly-protruding legs 281, 282, 283. Leg 282 protrudes into the hollow space of a spring 285 that biases the plate 272 into a raised position (as in FIG. 13) wherein leg 283 resides in portions of the slot 274 in both the base 212 and the cover 214. Specifically, the lower corner 291 of leg 283 resides in the slot portion in base 212, while upper corner 292 of leg 283 resides in the slot portion of the cover 214. With the lock plate 272 in this position, as shown in FIG. 13, the cover 214 is blocked by leg 283 from rotating relative to the base 212, so that cover 214 remains closed over the pins 224, as shown in FIG. 12.

Figure 14:
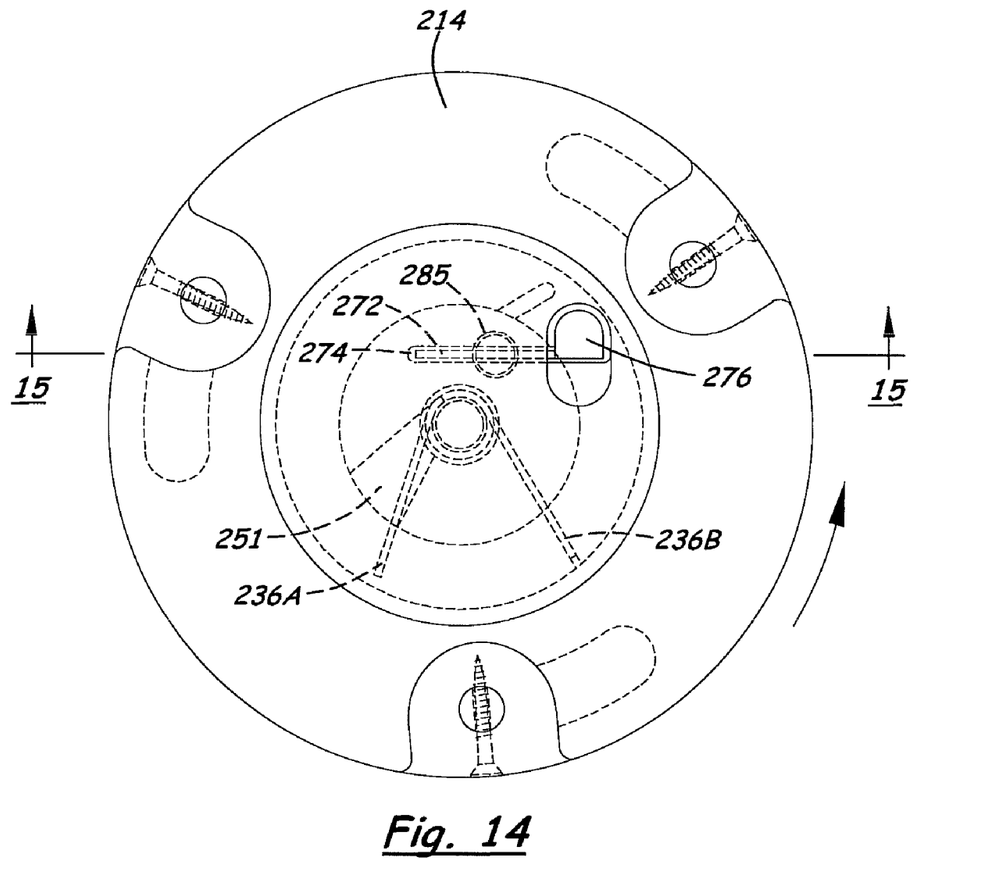
FIG. 14 is a top view of the embodiment of FIGS. 12 and 13, wherein the lock has been depressed and the cover has been rotated approximately 30 degrees to reveal the pins, whereby the blades (not shown in this view) could be installed and/or removed from the pins. Note in this view that the spring arm has been forced to rotate with the cover about 30 degrees.
Figure 15:
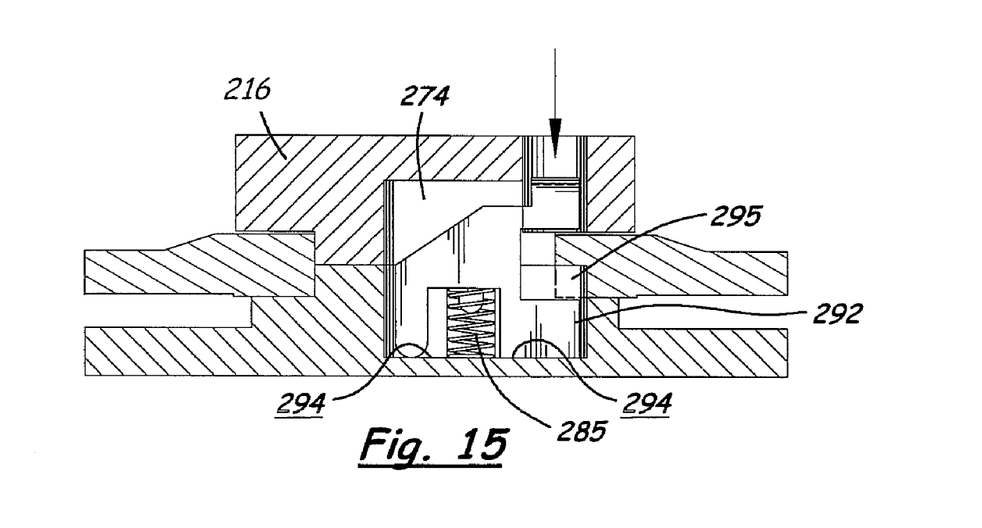
FIG. 15 is a cross-sectional view of the embodiment of FIGS. 12-14, viewed along the line 15-15 in FIG. 14, wherein the lock may be viewed in the unlocked position.

When the user desires to uncover the pins and blades, the lock 270 may be unlocked by depressing handle 276, as shown in FIG. 15. Upon doing so, plate 272 slides downward (axially) in the vertical slot 274, against the bias of spring 285 (compressing spring 285), to the point at which leg 281 and leg 283 abut against the bottom wall 294 of the slot. The plate 272 is sized and shaped so that, at this point, the upper corner 292 is completely removed from the vertical slot portion 295 of the cover 214, that is, is lower than the cover, so that the cover 214 may now rotate relative to the base 212. It may be noted that most of the structure of plate 272 resides at all times in the base 212 and cap 216, with only leg 283 extending generally radially outward to pass through a portion of the cover 214 (specifically through slot portion 295). The plate 272 slides up and down to a raised position wherein leg 283 extends across the boundary between base 212 and cover 214 to block relative movement, and to a lowered position wherein leg 283 is lowered out of the way of the cover 214 to allow relative movement. As shown in FIG. 14, when the lock is lowered as it is in FIG. 15, cover 214 may be rotated to uncover the ends of blades 20 (not shown) on pins 224.

The lock handle 276 optionally may be released as soon as the cover is manually rotated to the open position, as spring 285 will urge the plate 272 to the lock position, but the plate 272 will not be able to re-enter the slot portion 295 in the cover until the cover again returns to the closed position and the slot portion 295 is again aligned with the portion of slot 274 in the base. Alternatively, the lock handle 276 may be held in the depressed condition by a finger of the same hand that is holding the cutting head (while the other hand rotates the cover), for example, until the one hand releases the cover and the other hand releases the handle 276 of the lock, and/or until both hands are removed.

Referring to FIGS. 16-22, there is shown yet another alternative cutting head 300, which uses an annular spring system for biasing the cover 314 to a closed position, and that uses a horizontal lock system. Base 312 comprises platform 325 having a large central bore 333. Cap 316 rests on base 312 and is fixed to base 312, for example, by screws 317 that anchor an inner ring 313 of base 312 to a downwardly-protruding ring 319 of cap 316. Rotatably received between base 312 and cap 316 is cover 314. Accommodation may be made to one or both of the base 312 and cover 314 to help prevent blade outer ends 20 (see FIG. 3) from becoming wedged between base 312 and cover 314 if said outer ends 20 swing into the space between the base and cover. For example, a lip 326 (FIG. 17) and/or other curvature in surfaces adjacent to the lip 326 may be provided to deflect or block said outer ends 20". Both cover 314 and cap 316 also have large central bores, which aligns with large bore 333 to provide a large central cavity 334 through the head 300 that may be used to connect the head 300 to many different cutting machines. For some machines, an adapter may be used to fit the head 300 to the machine.

Figure 16:
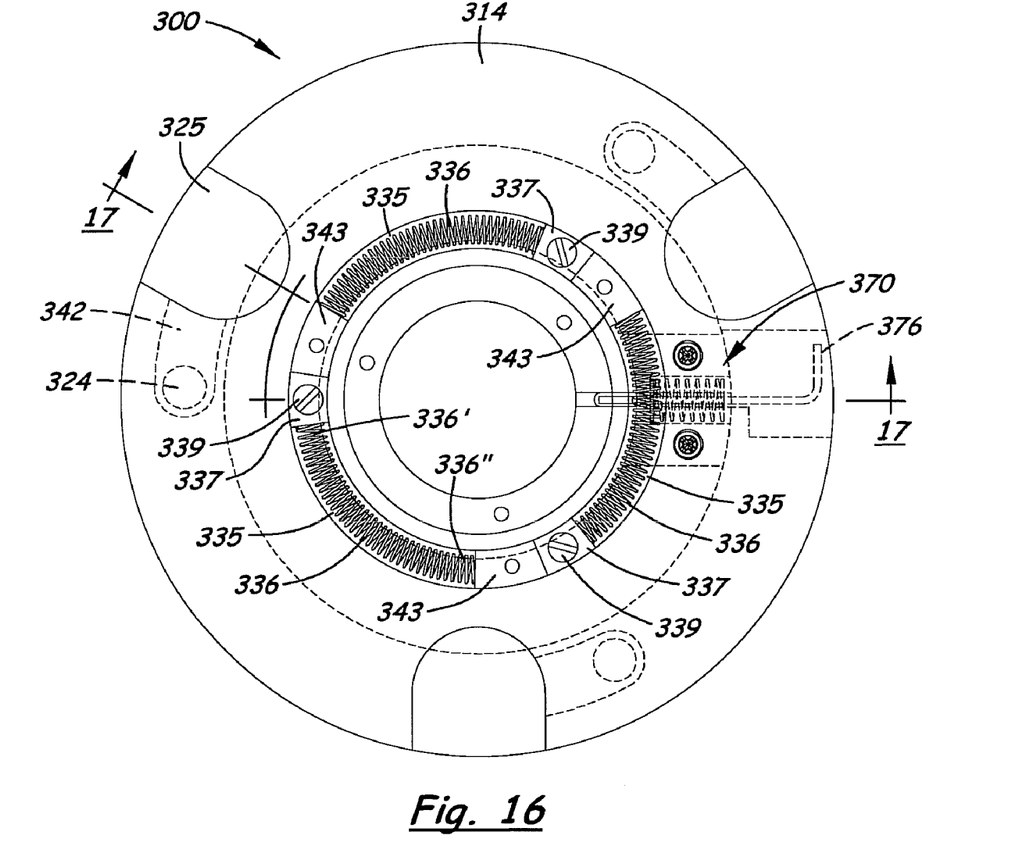
FIG. 16 is a top view of yet another alternative embodiment of the invented cutting head 300, wherein the cap is removed to reveal the annular spring system that biases the cover to a closed position.
Figure 17:
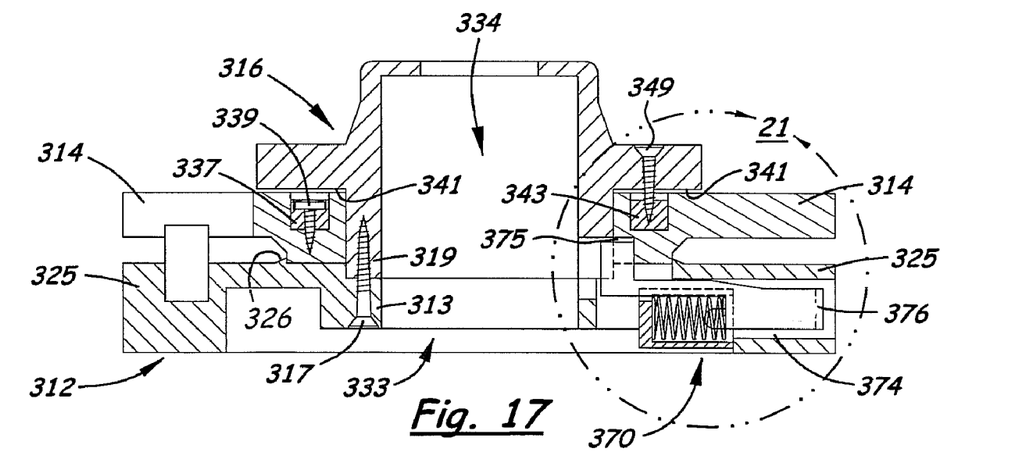
FIG. 17 is a schematic, cross-sectional view of the embodiment of FIG. 16, with cap installed, and the cross-sectional view being adapted so that the structure that controls each end of the springs is shown in addition to the lock system being shown.

As in the other embodiments discussed above, blades are rotatably received on the pins 324 of cutting head 300, and covered/retained by cover 314 by virtue of the tops of the pins 324 being received in channels 342 of the cover (FIG. 16). When the cover 314 is rotated approximately 25-45 degrees (and, more preferably, about 30 degrees, FIG. 18) the pins 324 are uncovered to allow removal of the blades.

Figure 18:
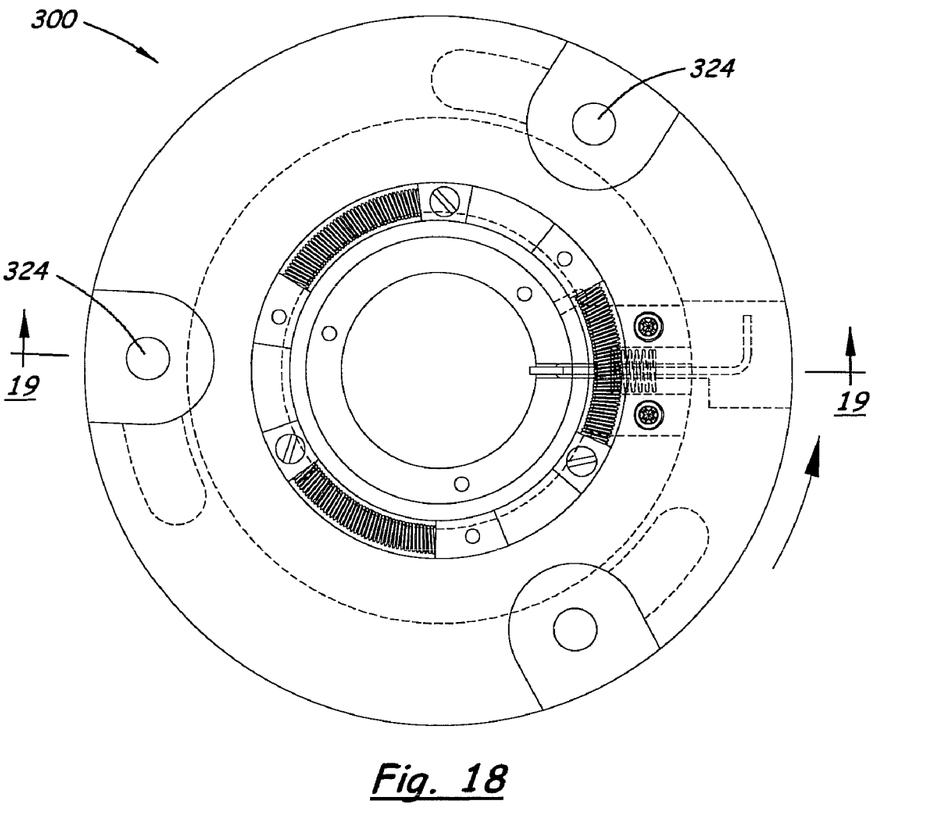
FIG. 18 is a top view of the embodiment of FIGS. 16 and 17, with cap removed, illustrating the lock unlocked, and the cover having been rotated counterclockwise and the annular springs compressed by said rotation of the cover.
Figure 19:
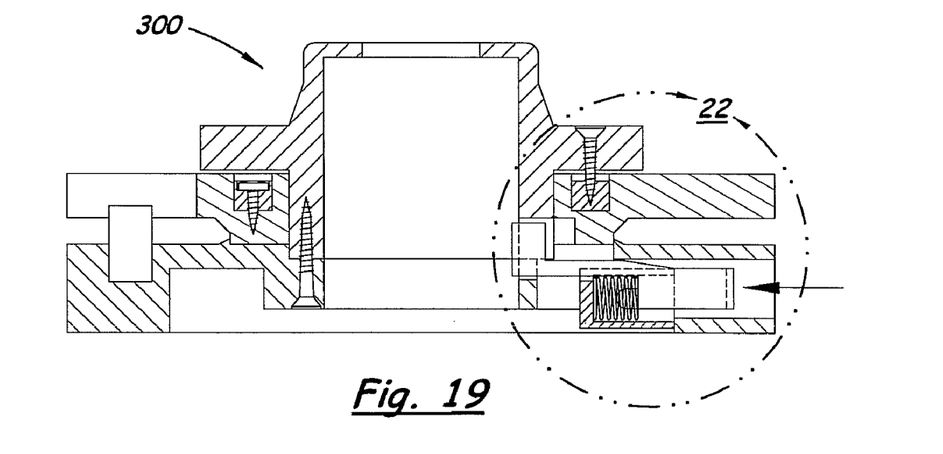
FIG. 19 is a schematic cross-sectional view of the embodiment of FIG. 16-18, with the lock in the open position, again with the cross-sectional view being adapted so that the structure that controls each end of the springs is shown in addition to the lock system being shown.
Figure 20:
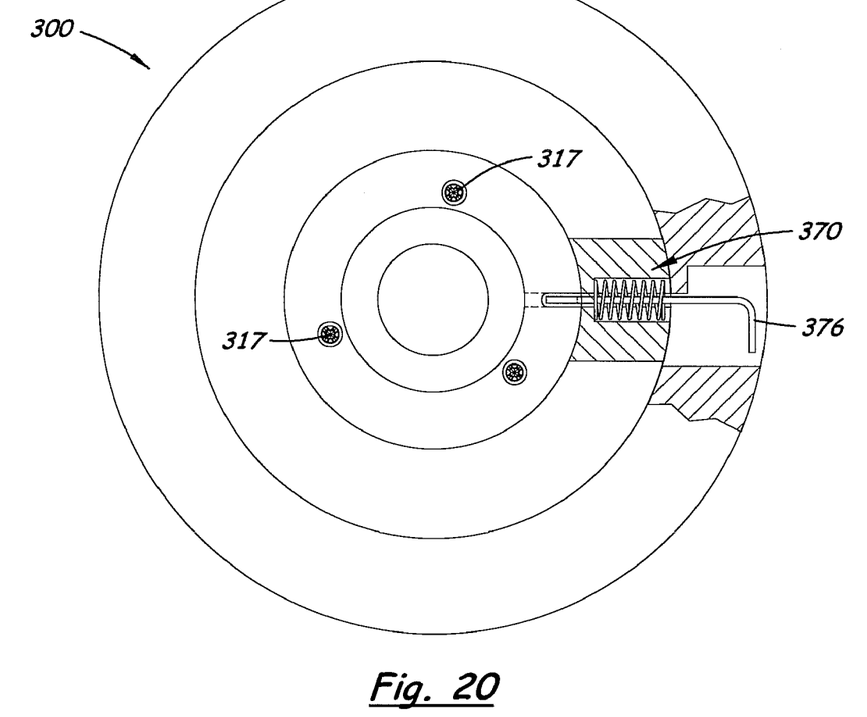
FIG. 20 is bottom view of the assembled cutting head of FIGS. 16-19, with the structure below the locked lock system cut away.
Figure 21:
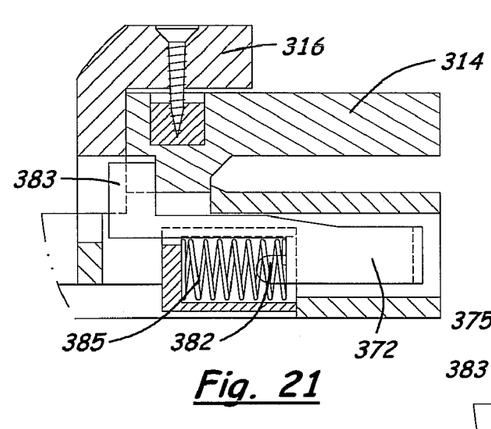
FIGS. 21 and 22 are detail, cross-sectional views of the embodiment of FIGS. 16-20, wherein the lock is locked (cover closed and locked) in FIG. 21 and the lock is unlocked (cover may be opened) in FIG. 22.
Figure 22:
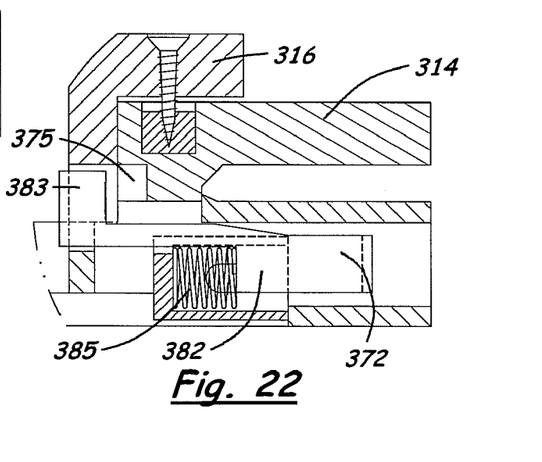

Referring specifically to FIGS. 16 and 18, head 300 is shown with cap 316 remove, by removing screws 317 and lifting cap 316 up off of the head 300. This allows the spring bias system for cover 314 to be more easily viewed. It should be noted, also, that the three cap-abutment-members 343, which are normally fixed to the underside (bottom surface 341) of cap 316 by screws 349, are shown in FIGS. 16 and 18 as being removed from the cap 316 and left resting in the annular grooves at the second ends 336" of the springs 336. The holes that are normally threadably engaged by screws 349 are left empty in these views. This way, members 343 may be viewed in their preferred position for use in compressing springs 336, as is further described below.

Cover 314 has in its upper surface one or more, and preferably three, annular grooves 335 that each receives a coil spring 336. At one end of each groove is a cover-abutment-member 337 against which is placed a first end 336' of each spring. As shown in FIGS. 16-19, the three cover-abutment-members 337 may be three inserted pieces fastened by screws 339 into a single circular groove at three locations approximately 120 degrees apart, to separate said single circular groove into three end-to-end grooves 335. Alternatively, the three cover-abutment-members may be closed ends of three separate channels molded or otherwise forming in the cover. In either structure, the first end 336' of each spring abuts against one of the cover-abutment-members 337.

A second end 336" of each spring abuts against a cap-abutment-member 343. The cap-abutment-members 343 are attached to, and extend downward from, the underside of the cap 316, for example, by means of screws 349 retaining the members 343 against the bottom surface 341. Cap-abutment-members 343 extend into, and slide in, each groove 335 at the second ends 336" of the springs 336. When cover 316 is rotated relative to the base 312 and cap 316, the cover-abutment-members 337 move counterclockwise (in FIG. 16) relative to the base 312 and cap 316 and compress the springs 336 against the cap-abutment-members 343. Thus, the springs 336 are compressed between the members 337 and members 343 as shown in FIG. 18.

Springs 336 are retained from popping out of the grooves 335 by virtue of being captured between the groove surfaces (below and at two sides of the spring) and the bottom surface 341 of cap 316 (above the spring). The springs creates the bias that tends to keep the cover 314 closed over the pins 324.

Lock 370 is provided in cutting head 300 in a position that allows it to be accessed from the outer perimeter surface of the base 312, rather than from the top of the cutting head. This may allow the user to push the handle 376 with a finger of the hand holding the base 312, while the other hand rotates the cover 314. The details and operation of lock 370 are shown to best advantage in FIGS. 17 and 21 (locked) and FIGS. 19 and 22 (unlocked).

Lock 370 comprises plate 372 that resides in a vertically-orientated slot 374 that extends horizontally through the base 312 and upward into the cover 314 (slot portion 375). Plate 372 has two legs 382, 383, wherein leg 382 protrudes into a lock spring 385 and leg 383 protrudes up into slot portion 375 of cover 314. As one may see to best advantage in FIGS. 21 and 22, depressing handle 376 pushes plate 372 radially inward toward the center of the head 300, moving leg 383 radially out of slot portion 375 (FIG. 22), so that cover 314 can rotate relative to base 312 and cap 316. Upon releasing the lock handle 376, spring 385 biases the plate 372 radially outward again and leg 383 again crosses the boundary between, and resides in both, base 312 and cover 314, thus, locking the cover.

A user may change out cutting blades on the preferred embodiments of the invention, without tools and typically with one hand opening the cover and the other hand removing and replacing the blade(s). In embodiments wherein a lock is included, the user may need to use both hands to accomplish the task of depressing the lock, rotating the cover, and removing/replacing the blade(s). Upon release of the hand(s), the preferred cover will rotate/snap back into a position that covers the ends of the blades and the connection between the blades and the cutting head, and, in embodiments that have a lock, the lock will spring back into the locked position.

No tools need to be used for the blade-change-out process. If a person has problems with agility or with use of one of his hands, an item such as a cap or spacer may be inserted, upon opening of the cover, between one of the blades (not being replaced) and the spring-biased cover, to block the cover from rotating/snapping into closed position until the cap/spacer is removed. This way, the user would not have to hold the cover over while replacing the blade(s).

The rotation of the cover and base relative to one another preferably comprises rotating the upper portion relative to a temporarily-stationary lower portion, as described above and in the figures. In other embodiments, structure that allows rotating the lower portion relative to a temporarily-stationary upper portion may be used, or, in other embodiments, structure that allows rotating both upper and lower portions at the same time. In each case, there are various constructions other than that shown in the drawings that might allow these types of rotation, but the preferred embodiment, wherein the upper portion rotated relative to the lower portion offers simple design, simple and safe operation, and low chance of any pieces or parts falling out and becoming lost or becoming a hazard. Having the upper portion rotate to reveal the blades is preferable because the blades remain supported on the lower portion, preferably on pins in the lower portion, even when the upper portion has been rotated, thus, allow the user to reach and lift the blades without significant chance of the blades falling to the ground.

While several embodiments have been described and drawn, it should be noted that other embodiments may have bodies that are shaped, and that cooperate, differently. The preferred structures and functions are a base that supports the blades, a cover that retains the blades on the base, and apparatus for rotatably joining the cover to the base and for joining the base to the cutting machine. Typically, the cover is rotatably received between the base and a cap, wherein both base and cap are fixed to each other and fixed to the machine, but other arrangements may be used.

Although this invention has been described above and drawn with reference to particular means, materials, and embodiments, it is to be understood that the invention is not limited to these disclosed particulars, but extends instead to all equivalents within the broad scope of the following claims.

The invention claimed is:

1. A cutting head for a rotary cutting machine for vegetation, the head comprising:

a base adapted to be fixed to a rotating shaft of a rotary cutting machine, the base having a platform surface on a plane transverse to the rotating shaft, and the base having multiple pins upending from the platform surface in a direction perpendicular to the platform surface;

a plurality of cutting blades installed on said pins with each blade having a hole slidably receiving one of said pin;

a cover, in a closed position, over the pins, and rotatable to an open position not covering said pins, so that said blades are removable without tools when the cover is in the open position;

a spring system that biases said cover into the closed position;

a lock system comprising a slot and a lock member, the slot extending from an outer perimeter of the base through a portion of the base and up through a portion of the cover so that the slot comprises a base slot portion and a cover slot portion, and the lock member comprising a handle accessible in an aperture at said outer perimeter surface of the base and a plate received in said slot, wherein when the cover is in the closed position, the plate is biased to reside in both the base slot portion and the cover slot portion to block rotation of the cover relative to the base, and wherein, when the handle of the lock system is depressed into said slot, the plate moves out of the cover slot portion so that the plate does not block rotation of the cover relative to the base so that the cover is movable to said open position for removal of the blades.

2. The cutting head of claim 1, wherein the lock system extends generally horizontally in said cutting head and the handle is at or near an outer perimeter surface of the base and is pressed inward toward a center of the cutting head to unlock the lock.

3. The cutting head of claim 1, wherein said base comprises a plate that rises above, and is inward relative to, the platform surface, and a spindle that rises above, and is inward relative to, said plate, wherein the cover rests on said plate and has a central bore that rotatably receives the spindle so that the cover rotates around the spindle spaced a vertical distance from the platform surface equal to the thickness of the plate.

4. The cutting head of claim 3, further comprising a cap that extends over a central portion of the cover, the cap having a downwardly-protruding ring that extends through the central bore of the cover to contact and be fixed to the spindle.

* * * * *